United States Patent
Sakuma et al.

(10) Patent No.: US 6,812,197 B2
(45) Date of Patent: Nov. 2, 2004

(54) IRON-BASED CLEANING POWDER

(75) Inventors: Hitoshi Sakuma, Takasago (JP); Kenji Kawai, Takasago (JP); Yoshikazu Seki, Takasago (JP); Masaaki Matsubara, Kobe (JP); Yasuko Yakou, Kobe (JP); Koji Yamamoto, Kobe (JP)

(73) Assignee: Kobe Steel, Ltd., Kobe (JP)

( * ) Notice: Subject to any disclaimer, the term of this patent is extended or adjusted under 35 U.S.C. 154(b) by 0 days.

(21) Appl. No.: 10/606,232

(22) Filed: Jun. 26, 2003

(65) Prior Publication Data

US 2004/0009887 A1 Jan. 15, 2004

(30) Foreign Application Priority Data

Jun. 26, 2002 (JP) ....................................... 2002-186278

(51) Int. Cl.$^7$ ............................................... C11D 17/00

(52) U.S. Cl. ........................ 510/247; 510/248; 510/508

(58) Field of Search ................................. 510/247, 248, 510/508

(56) References Cited

FOREIGN PATENT DOCUMENTS

| JP | 11-235577 | 8/1999 |
|---|---|---|
| JP | 2001-9475 | 1/2001 |
| JP | 2002-20806 | 1/2002 |

*Primary Examiner*—Necholus Ogden
(74) *Attorney, Agent, or Firm*—Oblon, Spivak, McClelland, Maier & Neustadt, P.C.

(57) ABSTRACT

The invention provides an iron-based cleaning powder capable of efficiently decomposing organic halides. The iron-based cleaning powder is made of iron alloy powder or iron powder produced with an atomization process. The iron alloy powder passes a 300 μm-mesh sieve at a proportion of not less than 90% and has an $H_2$-reduction mass loss of 0.1 to 0.8% when it contains 0.3 to 1.1% of Mn. When the iron alloy powder contains 0.2 to 12% of Ni, it has an $H_2$-reduction mass loss of 0.1 to 1.0%. The iron powder is used as mixed powder or partially alloyed powder together with Ni-containing powder. The iron powder passes a 300 μm-mesh sieve at a proportion of not less than 90% and has an $H_2$-reduction mass loss of 0.1 to 1.0%. The Ni-containing powder has a Ni content of not less than 40% and passes a 45 μm-mesh sieve at a proportion of not less than 90%. The iron alloy powder and the iron powder have a martensite structure or a tempered martensite structure.

5 Claims, No Drawings

IRON-BASED CLEANING POWDER

BACKGROUND OF THE INVENTION

1. Field of the Invention

The present invention relates to an iron-based powder useful for cleaning materials (particularly soil, underground water, etc.) contaminated with organic halides.

2. Description of the Related Art

Volatile organic chlorine compounds, such as trichloroethylene, have widely been used not only as degreasing detergents in semiconductor factories and metal working factories, but also as detergents in dry cleaning. However, those organic chlorine compounds have often been discharged and discarded in the past. Because the organic chlorine compounds are hard to decompose in the natural world, they are gradually accumulated in and contaminate the soil and the underground water, thus resulting in a social problem.

Known treatment methods for rendering contaminants in the soil and the underground water harmless include, for example, a pyrolysis method comprising the steps of excavating contaminated soil and removing the contaminants with combustion using a rotary kiln or the like, a soil vapor extraction method comprising the steps of sucking contaminants dissolved in the underground water with a vacuum pump and recovering the contaminants for removal, a pumping treatment method comprising the steps of pumping up the underground water and extracting contaminants for removal, and a microbial method utilizing the microbe ability of decomposing contaminants.

Those treatment methods, however, have disadvantages as follows. The pyrolysis method needs large-scaled equipment for excavating the soil and requires a high cost when the soil after the heat treatment is utilized for refilling. The soil vapor extraction method is able to recover only vaporized contaminants and raises the necessity of decomposing the contaminants after the recovery. The pumping treatment method is able to recover only contaminants dissolved in water and requires decomposition of the contaminants after the recovery. The microbial method cannot be applied to some cases depending on soil conditions. Further, because the microbial method relies on the decomposing reaction caused by microbes, there is a disadvantage that a longer treatment period than the other methods is needed in the case of high-concentration contamination, or the decomposing reaction proceeds just halfway in some cases.

A method of reducing and decomposing organic chlorine compounds using iron powder has been proposed as a method that requires neither large-scaled equipment nor the decomposing process after the recovery and can render the organic chlorine compounds harmless with stability. The proposed method utilizes electrons generated upon oxidization of the iron powder and decomposes the organic chlorine compounds while reducing them. However, the decomposition efficiency of the organic chlorine compounds with the iron powder is not so high because of the specific property, and hence a variety of methods are proposed for more satisfactory practical use.

For example, Japanese Examined Patent Application Publication No. 2-49158 proposes a method for decomposing hydrocarbon halides by adding iron powder to water, which is to be treated and contains hard-to-decompose hydrocarbon halides, and by shaking a mixture, the method comprising the steps of removing dissolved oxygen from the treated water in advance and adjusting the treated water to the pH range of 6.5 to 9.5. However, this method requires complicated operations, such as removal of the dissolved oxygen and the pH adjustment, and hence has a difficulty in application to field treatment in the contaminated site.

Japanese Patent Publication (by PCT Application) No. 6-506631 proposes a method for decomposing contaminated water containing organic chlorine compounds to render it harmless by passing the contaminated water through filings of iron and steel, the method comprising the steps of mixing the filings of iron and steel with activated coal, and passing the contaminated water through a mixture layer. However, this method necessitates the use of expensive activated coal and increases a treatment cost.

Recently, methods for increasing reactivity of iron powder itself without requiring pretreatment of contaminated soil and water or without employing activated coal have also been proposed. For example, Japanese Unexamined Patent Application Publication No. 11-235577 discloses a method comprising the steps of mixing soil with iron powder having a carbon content of not less than 0.1 weight % and a specific surface area of not less than 500 $cm^2/g$, and decomposing organic chlorine compounds in the soil. The iron powder having a large specific surface area is provided as iron powder obtained by reducing iron ore (i.e., sponge-shaped ore-reduced iron powder). However, iron powder other than the sponge-shaped ore-reduced iron powder cannot be practically used because reactivity lowers when the iron powder has a smaller specific surface area.

Also, Japanese Unexamined Patent Application Publication No. 2001-9475 proposes the use of iron powder containing copper in consideration of that metallic copper noticeably promotes the reaction of decomposing organic halogen compounds, which is caused by metallic iron. However, copper has a high material cost. Further, when producing the iron powder containing copper, the proposal requires a complicated production process of mixing iron powder in a copper ion solution, such as an aqueous solution of copper sulfate, and recovering an obtained precipitate, whereby the production cost is increased.

In addition to the sponge-shaped iron powder mentioned above, atomized iron powder is also known. The atomized iron powder is produced by atomizing molten steel into powder. The as-atomized powder is called black powder because the powder surface is oxidized to become black. The black powder is perfectly reduced, as required, into a reduced powder. The reduced powder is called white powder in contrast with the black powder. The white powder is coated with a resin, which serves as a binder, over the powder surface, and is employed in the field of powder metallurgy. There is also proposed a method of utilizing the iron powder for powder metallurgy (i.e., the atomized iron powder) instead of the sponge-shaped iron powder for the purpose of cleaning soil.

For example, Japanese Unexamined Patent Application Publication No. 2002-20806 suggests a proposal of containing 0.01 to 4.0 mass % of Ni in the iron powder for powder metallurgy in consideration of that hydrogen produced on Ni surfaces promotes the decomposing reaction (including the reducing reaction of organic halogen contaminants and the oxidizing reaction of metals). However, this Publication states that reactivity of the cleaning reaction lowers when oxides are formed on powder surfaces.

SUMMARY OF THE INVENTION

In view of the state of the art described above, it is an object of the present invention to provide an iron-based cleaning powder capable of efficiently decomposing organic halides even when oxides are formed on powder surfaces.

Another object of the present invention is to provide an iron-based cleaning powder which is capable of decomposing organic halides at higher efficiency than the so-called white powder and can be produced in a more simple process than the white powder.

As a result of conducting intensive studies to achieve the above objects, the inventors discovered that, if the oxides formed on the powder surfaces are ones formed during atomization, even iron powder having those oxides is able to efficiently decompose organic halides on the contrary to the suggestion stated in the above-cited Japanese Unexamined Patent Application Publication No. 2002-20806, and then found that iron powder (black powder) obtained with the atomization process can be used for the purpose of cleaning materials (such as soil and underground water) contaminated with organic halides. Also, the inventors found that the effective use of the black powder eliminates the necessity of reducing the black powder to the white powder and enables cleaning iron powder to be provided with a simpler process. Further, the inventors found that, by preventing the oxidization in the atomization process as much as possible, resulting iron powder (comprising a martensite structure) is able to decompose organic halides at higher efficiency than the white powder (comprising a ferrite structure) obtained by reducing the resulting iron powder. Based on those findings, the present invention was accomplished. In order to obtain the effect decomposing, it is required that the iron powder comprises a martensite structure (including a tempered martensite structure).

To describe the present invention in detail, the inventors found that black powder (such as iron alloy powder and iron powder) can be effectively used for the purpose of cleaning materials (such as soil and underground water) contaminated with organic halides. The black powder is powder prepared with the atomization process and usually has an oxide coating formed on the powder surface at an $H_2$-reduction mass loss on the order of not less than 0.15%. The black powder may be partially reduced so long as an oxide remains on the powder surface (i.e., so long as the $H_2$-reduction mass loss is not less than 0.15%). Because the oxides on the surfaces of the black powder and the partially reduced powder thereof are ones formed during the atomization, those kinds of powder are able to effectively decompose organic halides in spite of the oxides remaining on the powder surfaces. The black powder comprises a martensite structure and the partially reduced power comprises a tempered martensite structure. Further, the black powder may be produced with atomization that is performed while preventing oxidization as much as possible (at the $H_2$-reduction mass loss on the order of not less than 0.1%, but less than 0.15%). Non-oxidized black powder thus obtained has the amount of an oxide coating (reduction mass loss) comparable to that of the white powder obtained by reducing ordinary black powder, but it is capable of decomposing organic halides at higher efficiency than the white powder probably because of the fact that the non-oxidized black powder has a different metallic structure from that of the white powder (i.e., the non-oxidized black powder= martensite structure and the white powder=ferrite structure).

To summarize the above explanation, the oxide coating formed in the atomization process effects better in the decomposing reaction than that newly formed after the iron powder is reduced into a white powder, and the structure of a martensite or a tempered martensite effects better in the decomposing reaction than that of ferrite.

More specifically, an iron-based cleaning powder according to the present invention is made of iron alloy powder (Fe—Mn alloy powder or Fe—Ni alloy powder) or iron powder, which is prepared with an atomization process and has an oxide coating, or it is made of iron alloy powder (Fe—Mn alloy powder or Fe—Ni alloy powder) or iron powder, which is prepared with an atomization process without reduction. The Fe—Mn alloy powder contains at least Mn in the range of 0.3 to 1.1% (mass %, this is similarly applied to % in the following), passes a 300 μm-mesh sieve at a proportion of not less than 90%, has an $H_2$-reduction mass loss of 0.1 to 0.8%, and has a martensite structure or a tempered martensite structure.

The Fe—Ni alloy powder contains at least Ni in the range of 0.2 to 12%, passes a 300 μm-mesh sieve at a proportion of not less than 90%, has an $H_2$-reduction mass loss of 0.1 to 1.0%, and has a martensite structure or a tempered martensite structure.

The iron powder is used together with Ni-containing powder. Practically, as the iron-based cleaning powder, the iron powder is used in the form of mixed powder or partially alloyed powder made up of the iron powder and the Ni-containing powder. The iron powder passes a 300 μm-mesh sieve at a proportion of not less than 90%, has an $H_2$-reduction mass loss of 0.1 to 1.0%, and has a martensite structure or a tempered martensite structure. The Ni-containing powder has a Ni content of not less than 40% and passes a 45 μm-mesh sieve at a proportion of not less than 90%. The Ni-containing powder usually has an $H_2$-reduction mass loss of 0 to 1.0%. Preferably, a ratio of the iron powder to the Ni-containing powder (i.e., the iron powder/the Ni-containing powder) is in the range of 99.5/0.5 to 80/20 (mass ratio).

In the following description, the term "black powder" means iron powder or iron alloy powder prepared with the atomization process, and is employed as including partially reduced powder on condition of excluding ordinary white power (powder of a ferrite structure). Also, the term "black powder" is employed as including powder that has no oxide coatings on the powder surface, so long as the powder is essentially black powder from the standpoint of metallic structure (i.e., so long as the powder has a martensite structure or a tempered martensite structure).

According to the present invention, since a coating formed during the atomization is selected as an oxide coating formed on the surface of the iron-based powder, it is possible to decompose (reduce) organic halides even when an oxide is present on the powder surface (i.e., even when the black powder has the oxide coating). Therefore, the iron-based cleaning powder can be produced with a simpler process. In addition, when using non-oxidized black powder, the organic halides can be decomposed (reduced) at higher efficiency than the white powder. It effects advantageously as described above that the black powder (partially reduced black powder and non-oxidized black powder) comprises a martensite structure and a tempered martensite structure. As a result, the present invention enables the effective use of the black powder, which has been regarded as not being able to decompose the organic halides in the past.

DESCRIPTION OF THE PREFERRED EMBODIMENTS

An iron-based cleaning powder according to the present invention is utilized to decompose (de-halogenate) organic halides. The de-halogenating action will be described below in detail.

When organic halides adhere to the surface of the iron-based cleaning powder, anode polarization and cathode polarization occur in the surface of the iron-based powder because of the difference in conditions between the metal side and the organic halide side (i.e., the environment side). Therefore, an electron flow generates such that elution (oxidization) of iron occurs and electrons are released on the anode side, while the released electrons cause the reducing action and the de-halogenating reaction (decomposition) occurs on the cathode side. Accordingly, there occurs a chemical reaction expressed by the following formula (1) as a whole:

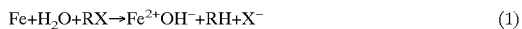
$$Fe+H_2O+RX \rightarrow Fe^{2+}OH^-+RH+X^- \qquad (1)$$

(where R represents an organic group and X represents a halogen atom, e.g., a chlorine atom)

From the reaction mechanism described above, it is expected that, when the surface of the iron-based powder is already oxidized, de-halogenation (decomposition) is hard to occur.

Contrary to such an expectation, the inventors discovered that reactivity of the above decomposing reaction does not lower if an oxide coating on the powder surface is one formed with the atomization process (such as the water atomization process), and found that the iron-based powder having such an oxide coating can be used for the purpose of cleaning materials (such as soil and underground water) contaminated with organic halides. Accordingly, a first feature point of the present invention is that the iron-based cleaning powder is made of oxidized iron-based powder (black powder) produced with the atomization process.

Usually, the black powder is produced by spraying a coolant (e.g., water) to molten steel for atomization in an atmosphere of non-oxidizing gas, such as inert gas, while avoiding oxidization. In spite of avoiding oxidization, an oxide coating is formed on the surface of the iron-based powder under the effect of oxygen present at a small amount in the coolant and the non-oxidizing gas. The amount of the oxide coating can be evaluated by reducing the black powder with $H_2$ and measuring a mass loss of the black powder after the reduction (reduction mass loss) (hereinafter referred to also as an "$H_2$ loss") in accordance with the standards stipulated by Japan Society of Powder and Powder Metallurgy (JSPM Standards 3-63). The $H_2$ loss of the black powder formed in the atmosphere of non-oxidizing gas depends on components of the black powder, but it is usually in the range of about 0.15% to about 1% (Precisely, the upper limit varies according to the kind of the alloy described later). Thus, the present invention can be said as being an invention of effectively utilizing the black powder having the $H_2$ loss of about 0.15% to about 1%.

In the present invention, iron alloy powder (Fe—Mn alloy powder or Fe—Ni alloy powder) or iron powder is used as the above-mentioned black powder. The iron alloy powder can be used, as it is, as the iron-based cleaning powder, and the iron powder is combined with Ni-containing powder into the form of mixed powder or partially alloyed powder when used as the iron-based cleaning powder. Note that, if the iron alloy powder and iron powder have low reactivity in their own properties in the condition in which no oxide coatings are formed on the powder surfaces, it is difficult to utilize them in the form of black powder for the cleaning purpose. Therefore, a range of the iron alloy powder and the iron powder effectively utilizable as the black powder is limited to a certain one. The following description is made of the case of using the Fe—Mn alloy powder, the case of using the Fe—Ni alloy powder, and the case of using the iron powder combined with the Ni—containing powder into the form of mixed powder or partially alloyed powder.

(1) Fe—Mn Alloy Powder

The Fe—Mn alloy powder is iron alloy powder containing at least Mn. Mn has a standard electrode potential of $E^0=-1.185$ V that is lower than $E^0=-0.894$ V of Fe. For this reason, Mn is advantageous in promoting the metal eroding reaction (oxidizing reaction) based on the potential difference and then promoting the decomposing reaction (reducing reaction) of organic halides. If the Mn content is too small, sufficient reactivity can not be obtained when the Fe—Mn alloy powder is used as the black powder. Therefore, the Mn content is selected to be not less than 0.3%, preferably not less than 0.4%, and more preferably not less than 0.45%. On the other hand, Mn tends to be more easily oxidized than Fe. Accordingly, if the Mn content is too large, the oxide coating would be formed in an excessive amount (namely, the $H_2$ loss would be too large) when the black powder is produced under the normal conditions, and sufficient reactivity would not be obtained. An upper limit of the Mn content is set to 1.1%, preferably 1.0%, and more preferably 0.95%.

Also, if the particle size of the Fe—Mn alloy powder is too large, the powder surface area per unit weight would be reduced and sufficient reactivity would not be obtained when the Fe—Mn alloy powder is used as the black powder. Hence, the present invention employs the Fe—Mn alloy powder that passes a 300 μm-mesh sieve at a proportion of not less than 90%, preferably not less than 93%, and more preferably not less than 95% (including 100%). Usually, the particle size of the Fe—Mn alloy powder is on the order of not more than 600 μm at maximum.

The Fe—Mn alloy powder (black powder) is produced with the atomization process under the normal conditions and has the $H_2$ loss of not less than 0.15% (preferably not less than 0.18% and more preferably not less than 0.2%, particularly not less than 0.3%, for example, not less than 0.4%), but of not more than 0.8% (preferably not more than 0.75%). If the $H_2$ loss departs from the above value range, the Fe—Mn alloy powder may be produced while improving the sealing condition or partly reducing it.

The Fe—Mn alloy powder (black powder) comprises a martensite structure when as atomized, and a tempered martensite structure when partially reduced. The structure of a martensite or a tempered martensite functions advantageously in the, decomposing reaction.

Further, different kinds of black powder (including partially reduced black powder) may be appropriately mixed with each other when used, and the black powder may be mixed with white powder as required. A ratio of the black powder (including partially reduced black powder) to the white powder (i.e., the former/the latter) is in the range of 100/0 to 10/90 (mass ratio), preferably 100/0 to 40/60 (mass ratio), and more preferably 100/0 to 80/20 (mass ratio).

The Fe—Mn alloy powder may contain Ni or may be mixed with Ni-containing powder described later.

By using the Fe—Mn alloy powder described above, the iron alloy powder can be used for the cleaning purpose with no need of essentially reducing the black powder (i.e., without converting it to the white powder).

(2) Fe—Ni Alloy Powder

The Fe—Ni alloy powder is iron alloy powder containing at least Ni. Ni has a high standard electrode potential of $E^0=-0.25$ V and hence cannot provide sufficient reactivity of metal erosion (oxidization). However, Ni exhibits a catalytic action and promotes the decomposing reaction (reducing reaction) of organic halides. More specifically, on the anode side, there occur two kinds of reactions, i.e., (A) $Fe+2H_2O \rightarrow Fe^{2+}+2OH^-+H_2$ and (B) $Fe+\frac{1}{2}O_2+H_2O \rightarrow Fe^{2+}+2OH^-$. When $H_2$ generated from the reaction (A) reduces the organic halides, Ni functions as a catalyst. If the Ni content is too small, sufficient reactivity can not be obtained when the Fe—Ni alloy powder is used as the black powder. Therefore, the Ni content is selected to be not less than 0.2%, preferably not less than 0.5%, and more preferably not less than 1%. On the other hand, as the Ni content increases, the Fe—Ni alloy powder tends to form a thicker oxide coating (to exhibit a larger $H_2$ loss) when the black powder is produced under the normal conditions. Accordingly, an upper limit of the Ni content is set to 12%, preferably 10%, and more preferably 8%.

Like the Fe—Mn alloy powder, the Fe—Ni alloy powder also preferably has a smaller particle size. Hence, the present invention employs the Fe—Ni alloy powder that passes a 300 μm-mesh sieve at a proportion of not less than 90%, preferably not less than 93%, and more preferably not less than 95% (including 100%). Usually, the particle size of the Fe—Ni alloy powder is on the order of not more than 600 μm at maximum.

Further, like the Fe—Mn alloy powder, the Fe—Ni alloy powder (black powder) is also produced with the atomization process under the normal conditions. While the Fe—Ni alloy powder may have a larger $H_2$ loss than the Fe—Mn alloy powder, it has the $H_2$ loss of not less than 0.15% (preferably not less than 0.18% and more preferably not less than 0.2%, particularly not less than 0.3%, for example, not less than 0.4%), but of not more than 1.0% (preferably not more than 0.95% and more preferably not more than 0.90%). If the $H_2$ loss departs from the above value range even under the normal conditions, the Fe—Mn alloy powder may be produced while improving the sealing condition or partly reducing it.

The Fe—Ni alloy powder (black powder) comprises a martensite structure when as atomized, and a tempered martensite structure when partially reduced. The structure of a martensite or a tempered martensite functions advantageously in the decomposing reaction.

Moreover, different kinds of black powder (including partially reduced black powder) may be appropriately mixed with each other when used, and the black powder may be mixed with white powder as required. A ratio of the black powder (including partially reduced black powder) to the white powder is substantially similar to the ratio in the case of using the Fe—Mn alloy powder.

The Fe—Ni alloy powder may contain Mn or may be mixed with Ni-containing powder described later.

By using the Fe—Ni alloy powder described above, the iron alloy powder can be used for the cleaning purpose with no need of essentially reducing the black powder (i.e., without converting it to the white powder).

(3) Mixed Powder or Partially alloyed Powder

The mixed powder used in the present invention is a mixture of iron powder and Ni-containing powder finer than the iron powder. The partially alloyed powder used in the present invention is prepared by attaching fine Ni-containing powder (hereinafter referred to also as "Ni-contained fine powder") to the surface of iron powder and then partly alloying the iron powder. Because the fine Ni-containing powder serves to increase reactivity, it is possible to sufficiently decompose (reduce) organic halides even when the iron powder is used as the black powder.

Like the Fe—Mn alloy powder and so on, the iron powder also preferably has a smaller particle size. Hence, the present invention employs the iron powder that passes a 300 μm-mesh sieve at a proportion of not less than 90%, preferably not less than 93%, and more preferably not less than 95% (including 100%). Usually, the particle size of the iron powder is on the order of not more than 600 μm at maximum.

Further, like the Fe—Mn alloy powder and so on, the iron powder (black powder) is also produced with the atomization process under the normal conditions, and has the $H_2$ loss of not less than 0.15% (preferably not less than 0.18% and more preferably not less than 0.2%, particularly not less than 0.3%, for example, not less than 0.4%), but of not more than 1.0% (preferably not more than 0.95% and more preferably not more than 0.90%). If the $H_2$ loss departs from the above value range under the normal conditions, the iron powder may be produced while improving the sealing condition or partly reducing it.

The iron powder (black powder) comprises a martensite structure when as atomized, and a tempered martensite structure when partially reduced. The structure of a martensite or a tempered martensite functions advantageously in the decomposing reaction.

Moreover, different kinds of black powder (including partially reduced black powder) may be appropriately mixed with each other when used, and the black powder may be mixed with white powder as required. A ratio of the black powder (including partially reduced black powder) to the white powder is substantially similar to the ratio in the case of using the Fe—Mn alloy powder.

While the iron powder may contain Mn and Ni, the Mn content is selected to be smaller than that of the Fe—Mn alloy powder and the Ni-content is selected to be smaller than that of the Fe—Ni alloy powder.

The Ni-containing powder is able to decompose (reduce) the organic halides even if the Ni purity is low, but the decomposition efficiency would drop if the Ni content is too small. Accordingly, the Ni content is selected to be not less than 40%, preferably not less than 45%, and more preferably not less than 50% (including 100%). Note that the balance is essentially Fe and the Ni-containing powder may contain trace amounts of additional components (such as C and Mn), unavoidable impurities (such as P and S), and other components.

The Ni-containing powder used in the present invention passes a 45 μm-mesh sieve at a proportion of not less than 90%, preferably not less than 93%, and more preferably not less than 95% (including 100%). If the particle size is too large, it would be impossible to sufficiently decompose (reduce) the organic halides when the iron powder is used as the black powder. Usually, the mean particle size of the Ni-containing powder is on the order of 1 to 15 μm (preferably 3 to 13 μm).

The Ni-containing powder can be produced with, e.g., the ultrahigh-pressure atomization process or the carbonyl process. The Ni-containing powder thus produced has the $H_2$ loss of, for example, not more than 1.0%, preferably not more than 0.9% and more preferably not more than 0.85% (including 0%).

A ratio of the iron powder to the Ni-containing powder (i.e., the iron powder/the Ni-containing powder) is, for example, in the range of 99.5/0.5 to 80/20 (mass ratio), preferably 99/1 to 85/15 (mass ratio), and more preferably 98/2 to 90/10 (mass ratio). As a proportion of the Ni-containing powder increases, efficiency in decomposing the organic halides is increased correspondingly.

The mixed powder is preferable to the partially alloyed powder, considering easiness of production.

The above-mentioned black powder (i.e., the Fe—Mn alloy powder, the Fe—Ni alloy powder, and the iron powder) may contain C, Si, P, S, etc. in addition to the essential components, and also may contain other components within a content range not adversely affecting the features of the present invention. Also, the apparent density (bulk density) of any kind of the black powder is usually on the order of 2.8 to 4 $g/cm^3$.

With the iron-based powder of the present invention, since the oxide coating on the powder surface is one formed during the atomization, the iron-based powder can decompose (reduce) the organic halides in spite of the oxide coating being present on the powder surface.

In the iron-based powder of the present invention, the black powder (such as the Fe—Mn alloy powder, the Fe—Ni alloy powder, and the iron powder, each including partially reduced black powder) as a constituent component of the iron-based powder may not essentially have an oxide coating on the powder surface (this kind of powder is often referred to as a "non-oxidized black powder" in this specification) so long as the powder is black powder from the standpoint of metallic structure (i.e., so long as the powder has a martensite structure or a tempered martensite structure). The non-oxidized black powder can be produced by setting a much severer condition than the normal sealing condition during the atomization so that oxygen in water and $N_2$, for example, is removed as far as possible. The $H_2$ loss of the non-oxidized black powder is, for example, not less than 0.1% (preferably not less than 0.12% and more preferably not less than 0.13%), but less than 0.15%. The production steps of the non-oxidized black powder are reduced compared with those of the white powder because the reduction process is omitted. In addition, because of the fact that the non-oxidized black powder having a martensite structure (or a tempered martensite structure) advantageously functions, the non-oxidized black powder can decompose (reduce) the organic halides at higher efficiency than the white powder even when the $H_2$ loss of the non-oxidized black powder is comparable to that of the white powder. Among the non-oxidized black powder, the Fe—Ni alloyed powder or the iron powder can decompose the organic halides at especially higher efficiency than the white powder Detailed properties of the non-oxidized black powder can be set depending on that it is classified to which one of the Fe—Mn alloy powder, the Fe—Ni alloy powder, and the iron powder, and are similar to those of the above-mentioned black powder having the oxide coating except for the range of the $H_2$ loss.

The organic halides decomposable with the iron-based powder of the present invention include, e.g., hydrocarbon halides such as trichloroethylene and dichloroethylene, and dioxin.

The iron-based powder of the present invention is useful for cleaning materials contaminated with the organic halides. For example, by mixing the iron-based powder to soil contaminated with the organic halides, or by mixing or passing underground water contaminated with the organic halides with or through the iron-based powder, it is possible to clean the soil and the underground water. As a result, a large-scaled treatment apparatus can be dispensed with and the treatment can be performed in the contaminated site (field position).

When performing the above-described cleaning process (such as the soil cleaning process and the underground water cleaning process), it may be combined with any other suitable cleaning process (e.g., a microbe process).

EXAMPLES

The present invention will be described below in more detail in connection with Examples. It is to be noted that the present invention is not restricted by the following Examples, but may be practiced with proper modifications within the range satisfying the purports of the present invention set forth in this specification, and that those modifications are all involved in the technical scope of the present invention.

In each of Examples, physical properties of a test sample were measured in accordance with methods described below.

[Reduction Mass Loss ($H_2$ Loss)]

The $H_2$ loss was measured in accordance with the standards stipulated by Japan Society of Powder and Powder Metallurgy (JSPM Standards 3-63). More specifically, the iron powder, the iron alloy powder, and the Ni-contained fine powder obtained in each of Experiment Examples was reduced with $H_2$ and the reduction mass loss ($H_2$ loss) was calculated based on a formula given below:

Reduction mass loss (mass %) =

([sample mass before reduction] − [sample mass after reduction])/

[sample mass before reduction] × 100

[Decomposition Reactivity]

A model sample of contaminated water was prepared by purging dissolved oxygen with pure bubbling of nitrogen and then adding trichloroethylene (TCE) (TCE concentration: 10 mg/L). After putting 100 ml of the model sample of contaminated water and 10 g of the iron-based powder prepared by each of Experimental Examples in a vial with a capacity of 125 ml in a sealed-off state, a resulting mixture was shaken for 144 hours using a horizontal shaker (100 strokes/min) in a room held at a temperature of 25° C. The TCE concentration after the shaking was measured using a gas chromatograph mass spectrometer, and a TCE residue rate was calculated based on a formula given below:

TCE residue rate (mass %)=[TCE concentration after shaking]/ [TCE concentration before the shaking]×100

Experimental Example 1

The Fe—Mn alloy powder (black powder) was produced by obtaining molten steel containing Mn, and thereafter water-atomizing the molten steel (atomization atmosphere: $N_2$ atmosphere) under the condition of water pressure of 9.8 to 12.7 MPa (100 to 130 $kgf/cm^2$). Each test sample of iron-based cleaning powder shown in Table 1 given below was prepared by dehydrating, drying and screening the produced Fe—Mn alloy powder (black powder; having a martensite structure) with a mesh sieve.

The decomposing reactivity of the iron-based cleaning powder thus prepared was tested. Test results are listed in Table 1. Only in No. 9 of the test samples, the condition of sealing off the atmosphere during the atomization was moderated.

TABLE 1

| No. | Components (mass %)* | | | | | $H_2$ Loss (mass %) | Apparent Density (g/cm³) | Sieve analysis | | | | TCE Residue Rate (mass %) |
|---|---|---|---|---|---|---|---|---|---|---|---|---|
| | C | Si | Mn | P | S | | | A) | B) | C) | D) | |
| 1 | 0.09 | 0.01 | 0.46 | 0.015 | 0.017 | 0.61 | 3.60 | 2.0 | 4.6 | 6.0 | 87.4 | 3.0 |
| 2 | 0.08 | 0.02 | 0.95 | 0.016 | 0.016 | 0.73 | 3.45 | 1.6 | 6.4 | 7.1 | 84.9 | 1.0 |
| 3 | 0.10 | 0.01 | 0.05 | 0.010 | 0.014 | 0.59 | 3.20 | 1.1 | 3.9 | 3.8 | 91.2 | 60.0 |
| 4 | 0.10 | 0.01 | 0.25 | 0.015 | 0.017 | 0.55 | 3.25 | 1.3 | 5.8 | 6.2 | 86.7 | 16.0 |
| 5 | 0.12 | 0.01 | 1.20 | 0.008 | 0.020 | 0.95 | 3.38 | 3.2 | 4.9 | 6.1 | 85.8 | 57.0 |
| 6 | 0.10 | 0.03 | 2.55 | 0.011 | 0.011 | 1.02 | 3.31 | 2.9 | 4.1 | 5.9 | 87.1 | 81.0 |
| 7 | 0.08 | 0.02 | 0.95 | 0.016 | 0.016 | 0.62 | 3.31 | 12.2 | 9.8 | 10.9 | 67.1 | 23.6 |
| 8 | 0.08 | 0.02 | 0.95 | 0.016 | 0.016 | 0.62 | 3.19 | 16.9 | 13.8 | 22.6 | 46.7 | 31.8 |
| 9 | 0.09 | 0.01 | 0.45 | 0.010 | 0.014 | 0.95 | 3.31 | 1.8 | 3.7 | 4.2 | 90.3 | 48.0 |

*Balance is Fe and unavoidable impurities.
A) not less than 300 μm (mass %)
B) 250–300 μm (mass %)
C) 180–250 μm (mass %)
D) less than 180 μm (mass %)

As is apparent from Nos. 1 to 8 of the test samples, under the condition of the water atomization, the powder surface is oxidized ($H_2$ loss=about 0.5 to 1%) even when the sealing-off is established with the $N_2$ atmosphere. Then, as is apparent from Nos. 1 and 2, so long as an oxide is one formed during the water atomization, trichloroethylene (TCE) can be efficiently decomposed by controlling each of the Mn content and the particle size distribution (sieve analysis) to be held within a predetermined range.

On the other hand, any of the Nos. 3 to 9 test samples cannot efficiently decompose TCE for the reasons given below. In Nos. 3 and 4, the Mn content is too small. In Nos. 5 and 6, the Mn content is excessive and the $H_2$ loss is increased too much. In Nos. 7 and 8, the particle size of the Fe—Mn alloy powder is too large. In No. 9, the condition of sealing off the atmosphere is moderated and therefore the $H_2$ loss is increased too much.

Experimental Example 2

After obtaining molten steel containing Ni, Fe—Ni alloyed powder (black powder; comprising a martensite structure) was produced in the same manner as in Experimental Example 1, each test sample of iron-based cleaning powder was prepared in the same manner as in Experimental Example 1 and the decomposing reactivity of the produced iron-based cleaning powder was tested. Test results are listed in Table 2 given below. Only in No. 18 of the test samples, the condition of sealing off the atmosphere during the atomization was moderated.

TABLE 2

| No. | Components (mass %)* | | | | | | $H_2$ Loss (mass %) | Apparent Density (g/cm³) | Sieve analysis | | | | TCE Residue Rate (mass %) |
|---|---|---|---|---|---|---|---|---|---|---|---|---|---|
| | C | Si | Mn | P | S | Ni | | | A) | B) | C) | D) | |
| 10 | 0.10 | 0.01 | 0.21 | 0.015 | 0.017 | 0.34 | 0.60 | 3.19 | 0.8 | 4.5 | 5.9 | 88.8 | 6.0 |
| 11 | 0.09 | 0.01 | 0.18 | 0.015 | 0.017 | 1.88 | 0.62 | 3.48 | 1.8 | 4.3 | 4.9 | 89.0 | 1.0 |
| 12 | 0.08 | 0.02 | 0.20 | 0.016 | 0.016 | 4.48 | 0.70 | 3.37 | 1.2 | 5.9 | 7.2 | 85.7 | 0.3 |
| 13 | 0.12 | 0.01 | 0.19 | 0.008 | 0.020 | 5.28 | 0.81 | 3.29 | 1.7 | 4.3 | 7.0 | 87.0 | 1.5 |
| 14 | 0.10 | 0.03 | 0.22 | 0.011 | 0.011 | 11.6 | 0.97 | 3.27 | 1.9 | 4.8 | 6.8 | 86.5 | 9.0 |
| 15 | 0.10 | 0.01 | 0.18 | 0.010 | 0.014 | 0.03 | 0.55 | 3.32 | 0.9 | 4.1 | 5.8 | 89.2 | 53.0 |
| 16 | 0.09 | 0.01 | 0.18 | 0.015 | 0.017 | 1.88 | 0.62 | 3.30 | 24.1 | 12.2 | 11.2 | 52.5 | 21.7 |
| 17 | 0.08 | 0.02 | 0.20 | 0.016 | 0.016 | 4.48 | 0.69 | 3.19 | 12.8 | 11.1 | 12.5 | 63.6 | 18.6 |
| 18 | 0.11 | 0.02 | 0.20 | 0.016 | 0.015 | 4.56 | 1.04 | 3.15 | 1.3 | 4.4 | 6.1 | 88.2 | 17.9 |

*Balance is Fe and unavoidable impurities.
A) not less than 300 μm (mass %)
B) 250–300 μm (mass %)
C) 180–250 μm (mass %)
D) less than 180 μm (mass %)

As is apparent from Nos. 10 to 17 of the test samples, under the condition of the water atomization, the powder surface is oxidized ($H_2$ loss=about 0.5 to 1%) even when the sealing-off is established with the $N_2$ atmosphere. Then, as is apparent from Nos. 10 to 14, so long as an oxide is one formed during the water atomization, trichloroethylene (TCE) can be efficiently decomposed by controlling each of the Ni content and the particle size distribution (sieve analysis) to be held within a predetermined range.

On the other hand, any of the Nos. 15 to 18 test samples cannot efficiently decompose TCE for the reasons given below. In No. 15, the Ni content is too small. In Nos. 16 and 17, the particle size of the Fe—Ni alloy powder is too large. In No. 18, the condition of sealing off the atmosphere is moderated and therefore the $H_2$ loss is increased too much.

Experimental Example 3

After obtaining molten steel containing Mn containing a small amount of Mn, but not essentially containing Ni, iron powder 2 (black powder; having a martensite structure) shown in Table 3 given below was obtained by producing iron powder, and dehydrating, drying and then screening the produced iron powder with a mesh sieve in the same manner as in Experimental Example 1. Also, iron powder 1 (white powder; having a ferrite structure) was obtained by reducing the iron powder 2.

On the other hand, Ni-based powder was produced by obtaining Ni-based molten steel, and thereafter water-atomizing the molten steel (atomization atmosphere: $N_2$ atmosphere) under the condition of water pressure of 68.6 to 88.3 MPa (700 to 900 kgf/cm$^2$). Each test sample of Ni-contained fine powder used for mixing, shown in Table 4 given below, was produced by dehydrating, drying and screening the produced Ni-based powder with a mesh sieve (in Table 4, "Ni-contained fine powder" was produced using the carbonyl process).

An iron-based cleaning powder was prepared by mixing the iron powder shown in Table 3 and the Ni-contained fine powder used for mixing, shown in Table 4, with each other. Then, the decomposing reactivity of the iron-based cleaning powder thus prepared was tested. Test results are listed in Table 5.

TABLE 3

| Name | Components (mass %)* | | | | | | H$_2$ Loss (mass %) | Apparent Density (g/cm$^3$) | Sieve analysis | | | |
|---|---|---|---|---|---|---|---|---|---|---|---|---|
| | C | Si | Mn | P | S | Ni | | | A) | B) | C) | D) |
| Iron Powder 1 | 0.001 | 0.01 | 0.18 | 0.020 | 0.015 | 0.01 | 0.12 | 3.21 | 1.3 | 4.6 | 5.2 | 88.9 |
| Iron Powder 2 | 0.13 | 0.01 | 0.18 | 0.020 | 0.015 | 0.01 | 0.55 | 3.28 | 1.1 | 3.8 | 4.4 | 90.7 |

*Balance is Fe and unavoidable impurities
A) not less than 300 μm (mass %)
B) 250–300 μm (mass %)
C) 180–250 μm (mass %)
D) less than 180 μm (mass %)

TABLE 4

| Name | Components (mass %)* | | | | | | H$_2$ Loss (mass %) | Sieve analysis | | | Mean Particle Size (μm) |
|---|---|---|---|---|---|---|---|---|---|---|---|
| | C | Si | Mn | P | S | Ni | | A) | B) | C) | |
| Ni-contained fine powder 1 | 0.01 | 0.01 | 0.01 | 0.003 | 0.002 | 46.0 | 0.26 | 0 | 2.6 | 97.4 | 10.0 |
| Ni-contained fine powder 2 | 0.01 | 0.01 | 0.01 | 0.003 | 0.002 | 77.0 | 0.25 | 0 | 1.7 | 98.3 | 12.5 |
| Ni-contained fine powder 3 | 0.01 | 0.01 | 0.01 | 0.003 | 0.002 | 91.0 | 0.30 | 0 | 1.8 | 98.2 | 11.0 |
| Ni-contained fine powder 4 | 0.03 | 0.01 | 0.01 | 0.002 | 0.001 | 99.0 | 0.85 | 0 | 1.5 | 98.5 | 8.0 |
| Ni-contained fine powder 5 | 0.09 | 0.01 | 0.01 | 0.001 | 0.001 | 99.0 | 0.15 | 0 | 0.6 | 99.4 | 5.0 |
| Ni-contained fine powder 6 | 0.01 | 0.01 | 0.01 | 0.003 | 0.002 | 31.0 | 0.33 | 0 | 2.1 | 97.9 | 11.6 |
| Ni-contained fine powder 7 | 0.01 | 0.01 | 0.01 | 0.003 | 0.002 | 77.0 | 0.26 | 0 | 14.3 | 85.7 | 21.6 |
| Ni-contained fine powder 8 | 0.01 | 0.01 | 0.01 | 0.003 | 0.002 | 91.0 | 0.28 | 0 | 17.7 | 82.3 | 24.8 |
| Ni-contained fine powder 9 | 0.01 | 0.01 | 0.01 | 0.003 | 0.002 | 99.0 | 0.21 | 0 | 23.1 | 76.9 | 30.4 |

*Balance is Fe and unavoidable impurities.
A) not less than 175 μm (mass %)
B) 45–175 μm (mass %)
C) less than 45 μm (mass %)

TABLE 5

| No. | Mixing Ratio (mass ratio) | | | | | | | | | | | TCE Residue Rate (mass %) |
|---|---|---|---|---|---|---|---|---|---|---|---|---|
| | A) | B) | C) | D) | E) | F) | G) | H) | I) | J) | K) | |
| 19 | 98 | | 2 | | | | | | | | | 9.7 |
| 20 | 98 | | | 2 | | | | | | | | 8.4 |
| 21 | 98 | | | | 2 | | | | | | | 4.1 |
| 22 | 98 | | | | | 2 | | | | | | 0.5 |
| 23 | 98 | | | | | | 2 | | | | | 0.3 |
| 24 | | 98 | 2 | | | | | | | | | 9.8 |
| 25 | | 98 | | 2 | | | | | | | | 9.7 |
| 26 | | 98 | | | 2 | | | | | | | 5.1 |
| 27 | | 98 | | | | 2 | | | | | | 0.9 |
| 28 | | 98 | | | | | 2 | | | | | 1.0 |
| 29 | | 98 | | | | | | 2 | | | | 22.8 |
| 30 | | 98 | | | | | | | 2 | | | 16.9 |
| 31 | | 98 | | | | | | | | 2 | | 19.9 |
| 32 | | 98 | | | | | | | | | 2 | 27.6 |

A) Iron Powder 1 (white powder)
B) Iron Powder 2 (black powder)
C) Ni-contained fine powder 1
D) Ni-contained fine powder 2
E) Ni-contained fine powder 3
F) Ni-contained fine powder 4
G) Ni-contained fine powder 5
H) Ni-contained fine powder 6
I) Ni-contained fine powder 7
J) Ni-contained fine powder 8
K) Ni-contained fine powder 9

As is apparent from Table 5, TCE can be efficiently decomposed (Nos. 19 to 23) by using the reduced iron powder (white powder: iron powder 1). Then, so long as an oxide attached to the surface of the iron powder 1 is one (corresponding to the black powder: iron powder 2) formed during the water atomization, TCE can be efficiently decomposed (Nos. 24 to 28) in spite of the oxide being formed on the powder surface similarly to the reduced iron powder.

Even in the case of using the black powder (iron powder 2), it is difficult to efficiently decompose TCE (Nos. 29 to 32) if the Ni content in the Ni-contained fine powder used together with the black powder is too small (Ni-contained fine powder 6), or if the particle size of the Ni-contained fine powder is too large (Ni-contained fine powder 7 to 9).

Experimental Example 4

Each test sample of Fe-Mn alloy powder (black powder; having a martensite structure) 1 to 3, shown in Table 6 given below, was prepared in the same manner as that in Experimental Example 1 except for properly changing the oxygen concentration in the $N_2$ atmosphere. Note that the Fe—Mn alloy powder 3 was normal black powder, and each of the Fe—Mn alloy powder 1 and 2 was black powder prepared while reducing the oxygen concentration in the $N_2$ atmosphere.

Also, Fe—Mn alloy powder 4 (white powder; having a ferrite structure) shown in Table 6 was prepared by reducing the above-mentioned Fe—Mn alloy powder (black powder) under the normal conditions ($N_2$ atmosphere including 50 volume % of $H_2$, reducing temperature=900 to 950° C., and heating time=30 minutes).

After mixing selected ones of the Fe—Mn alloy powder 1 to 4 with each other at ratios shown in Table 7 given below (to prepare each test sample of iron-based cleaning powder), the decomposing reactivity of the iron-based cleaning powder thus prepared was tested. Test results are listed in Table 7.

TABLE 6

| Name | Components (mass %)* | | | | | |
|---|---|---|---|---|---|---|
| | C | Si | Mn | P | S | Ni |
| Fe—Mn Alloy Powder 1 (non-oxidized black powder) | 0.13 | 0.01 | 0.46 | 0.020 | 0.015 | 0.01 |
| Fe—Mn Alloy Powder 2 (black powder) | 0.13 | 0.01 | 0.47 | 0.019 | 0.016 | 0.01 |
| Fe—Mn Alloy Powder 3 (black powder) | 0.13 | 0.01 | 0.46 | 0.020 | 0.015 | 0.01 |
| Fe—Mn Alloy Powder 4 (white powder) | 0.001 | 0.01 | 0.45 | 0.018 | 0.014 | 0.01 |

*Balance is Fe and unavoidable impurities.

TABLE 7

| No. | Mixing Ratio (mass ratio) | | | | $H_2$ Loss (mass %) | Apparent Density (g/cm$^3$) | Sieve analysis | | | | TCE Residue Rate (mass %) |
|---|---|---|---|---|---|---|---|---|---|---|---|
| | L) | M) | N) | O) | | | A) | B) | C) | D) | |
| 33 | 100 | | | | 0.10 | 3.48 | 1.1 | 5.0 | 5.3 | 88.6 | 3.2 |
| 34 | | 100 | | | 0.24 | 3.51 | 1.4 | 4.4 | 4.7 | 89.5 | 3.5 |
| 35 | | | 100 | | 0.35 | 3.45 | 1.3 | 4.7 | 5.1 | 88.9 | 3.1 |
| 36 | | | | 100 | 0.11 | 3.16 | 1.0 | 5.2 | 5.7 | 88.1 | 3.2 |
| 37 | | | 70 | 30 | 0.29 | 3.36 | 1.2 | 4.8 | 5.2 | 88.8 | 3.8 |
| 38 | | | 50 | 50 | 0.23 | 3.31 | 1.2 | 5.0 | 5.4 | 88.4 | 3.3 |
| 39 | | | 30 | 70 | 0.18 | 3.25 | 1.1 | 5.1 | 5.6 | 88.2 | 4.3 |

A) not less than 300 μm (mass %)
B) 250–300 μm (mass %)
C) 180–250 μm (mass %)
D) less than 180 μm (mass %)
L) Fe—Mn Alloy Powder 1 (non-oxidized black powder)
M) Fe—Mn Alloy Powder 2 (black powder)
N) Fe—Mn Alloy Powder 3 (black powder)
O) Fe—Mn Alloy Powder 4 (white powder)

As is apparent from Table 7, the test samples of Fe—Mn alloy-based black powder (Nos. 34 and 35) can efficiently decompose TCE at a level comparable to that of the Fe—Mn alloy-based white powder (No. 36) because an oxide attached to the powder surface is one formed during the water atomization, though the $H_2$ loss is in high level of not less than 0.15. The non-oxidized black powder (No. 33) can decompose TCE at a level comparable to that of the white powder (No. 36) because it can be produced in fewer steps than the white powder and comprises a martensite structure. Also, TCE can be efficiently decomposed (Nos. 37 to 39) with the combined use of the above-mentioned black powder with the white powder.

Experimental Example 5

Each test sample of Fe—Ni alloy powder (black powder; having a martensite structure) 1 to 3, shown in Table 8 given below, was prepared in the same manner as that in Experimental Example 2 except for properly changing the oxygen concentration in the $N_2$ atmosphere. Note that the Fe—Ni alloy powder 3 was normal black powder, and each of the Fe—Ni alloy powder 1 and 2 was black powder prepared while reducing the oxygen concentration in the $N_2$ atmosphere.

Also, Fe—Mn alloy powder 4 (white powder; having a ferrite structure) shown in Table 8 was prepared by reducing the above-mentioned Fe—Ni alloy powder (black powder) under the normal conditions ($N_2$ atmosphere including 50 volume % of $H_2$, reducing temperature=900 to 950° C., and heating time=30 minutes).

After mixing selected ones of the Fe—Ni alloy powder 1 to 4 with each other at ratios shown in Table 9 given below (to prepare each test sample of iron-based cleaning powder), the decomposing reactivity of the iron-based cleaning powder thus prepared was tested. Test results are listed in Table 9.

TABLE 8

| Name | Components (mass %)* | | | | | |
|---|---|---|---|---|---|---|
| | C | Si | Mn | P | S | Ni |
| Fe—Ni Alloy Powder 1 (non-oxidized black powder) | 0.09 | 0.01 | 0.18 | 0.015 | 0.017 | 1.91 |
| Fe—Ni Alloy Powder 2 (black powder) | 0.09 | 0.01 | 0.17 | 0.016 | 0.016 | 1.89 |
| Fe—Ni Alloy Powder 3 (black powder) | 0.09 | 0.01 | 0.18 | 0.015 | 0.018 | 1.88 |
| Fe—Ni Alloy Powder 4 (white powder) | 0.001 | 0.01 | 0.17 | 0.016 | 0.017 | 1.88 |

*Balance is Fe and unavoidable impurities.

TABLE 9

| No. | Mixing Ratio (mass ratio) | | | | $H_2$ Loss (mass %) | Apparent Density (g/cm³) | Sieve analysis | | | | TCE Residue Rate (mass %) |
|---|---|---|---|---|---|---|---|---|---|---|---|
| | L) | M) | N) | O) | | | A) | B) | C) | D) | |
| 40 | 100 | | | | 0.10 | 3.46 | 1.0 | 4.6 | 5.1 | 89.3 | 1.3 |
| 41 | | 100 | | | 0.21 | 3.44 | 0.9 | 4.3 | 4.4 | 90.4 | 0.9 |
| 42 | | | 100 | | 0.34 | 3.48 | 0.8 | 4.7 | 5.7 | 88.8 | 1.0 |
| 43 | | | | 100 | 0.12 | 3.12 | 1.7 | 6.6 | 6.1 | 85.6 | 1.8 |
| 44 | | | 70 | 30 | 0.27 | 3.37 | 0.9 | 5.3 | 5.8 | 88.0 | 0.8 |
| 45 | | | 50 | 50 | 0.23 | 3.30 | 1.3 | 5.7 | 5.9 | 87.0 | 1.2 |
| 46 | | | 30 | 70 | 0.19 | 3.23 | 1.5 | 6.0 | 6.0 | 86.5 | 1.3 |

A) not less than 300 μm (mass %)
B) 250–300 μm (mass %)
C) 180–250 μm (mass %)
D) less than 180 μm (mass %)
L) Fe—Ni Alloy Powder 1 (non-oxidized black powder)
M) Fe—Ni Alloy Powder 2 (black powder)
N) Fe—Ni Alloy Powder 3 (black powder)
O) Fe—Ni Alloy Powder 4 (white powder)

As is apparent from Table 9, the test samples of Fe—Ni alloy-based black powder (Nos. 41 and 42) can efficiently decompose TCE at a level comparable to that of the Fe—Ni alloy-based white powder (No. 43) because an oxide attached to the powder surface is one formed during the water atomization, though the $H_2$ loss is in high level of not less than 0.15. Also, the non-oxidized black powder of No. 40 wherein the $H_2$ loss is less than 0.15 can decompose TCE at higher efficiency than the white powder (No. 43) in spite of that the non-oxidized black powder has an amount of oxide (i.e., the $H_2$ loss) attached to the powder surface, which is comparable to that of the white powder, because it has a martensite structure. Further, TCE can be efficiently decomposed (Nos. 44 to 46) with the combined use of the above-mentioned black powder with the partially reduced black powder and the white powder.

Experimental Example 6

Each test sample of iron powder 3 to 5 (martensite structures), shown in Table 10 given below, was prepared in the same manner as that in Experimental Example 3 except for properly changing the oxygen concentration in the $N_2$ atmosphere. Note that the iron powder 5 was normal black powder, and each of the iron powder 3 and 4 was black powder prepared while reducing the oxygen concentration in the $N_2$ atmosphere.

Also, iron powder 6 (white powder; ferrite structure) shown in Table 10 was prepared by reducing the above-mentioned iron powder (black powder) under the normal conditions ($N_2$ atmosphere including 50 volume % of $H_2$, reducing temperature=900 to 950° C., and heating time=30 minutes).

After mixing the iron powder 3 to 6 with the Ni-contained fine powder 5 in Experimental Example 3 at ratios shown in Table 11 given below (to prepare each test sample of iron-based cleaning powder), the decomposing reactivity of the iron-based cleaning powder thus prepared was tested. Test results are listed in Table 11. In Table 11, the $H_2$ loss, the apparent density, and the sieve analysis were each measured in the condition before addition of the Ni-contained fine powder 5 (i.e., the condition of only the iron powder being present).

TABLE 10

| Name | Components (mass %)* | | | | | |
|---|---|---|---|---|---|---|
| | C | Si | Mn | P | S | Ni |
| Iron Powder 3 (non-oxidized black powder) | 0.13 | 0.01 | 0.18 | 0.020 | 0.015 | 0.01 |
| Iron Powder 4 (black powder) | 0.13 | 0.01 | 0.18 | 0.020 | 0.015 | 0.01 |
| Iron Powder 5 (black powder) | 0.13 | 0.01 | 0.18 | 0.020 | 0.015 | 0.01 |
| Iron Powder 6 (white powder) | 0.001 | 0.01 | 0.18 | 0.020 | 0.015 | 0.01 |

*Balance is Fe and unavoidable impurities.

TABLE 11

| | Mixing Ratio (mass ratio) | | | | | $H_2$ Loss | Apparent Density | Sieve analysis | | | | TCE Residue Rate |
|---|---|---|---|---|---|---|---|---|---|---|---|---|
| No. | E) | F) | G) | H) | I) | (mass %) | (g/cm³) | A) | B) | C) | D) | (mass %) |
| 47 | 100 | | | | 2 | 0.10 | 3.21 | 1.5 | 4.3 | 5.2 | 89.0 | 0.5 |
| 48 | | 100 | | | 2 | 0.20 | 3.30 | 1.7 | 4.1 | 4.9 | 89.3 | 0.2 |
| 49 | | | 100 | | 2 | 0.31 | 3.27 | 1.0 | 3.7 | 4.5 | 90.8 | 0.4 |
| 50 | | | | 100 | 2 | 0.12 | 3.21 | 1.3 | 4.6 | 5.2 | 88.9 | 0.7 |
| 51 | | | 70 | 30 | 2 | 0.25 | 3.26 | 1.1 | 4.0 | 4.7 | 90.2 | 0.8 |
| 52 | | | 50 | 50 | 2 | 0.22 | 3.24 | 1.2 | 4.2 | 4.9 | 89.7 | 0.5 |
| 53 | | | 30 | 70 | 2 | 0.17 | 3.22 | 1.3 | 4.4 | 5.0 | 88.9 | 0.8 |

A) not less than 300 μm (mass %)
B) 250–300 μm (mass %)
C) 180–250 μm (mass %)
D) less than 180 μm (mass %)
E) Iron Powder 3 (non-oxidized black powder)
F) Iron Powder 4 (black powder)
G) Iron Powder 5 (black powder)
H) Iron Powder 6 (white powder)
I) Ni-contained fine powder 5

As is apparent from Table 11, the test samples of non-alloyed black powder (Nos. 48 and 49) can efficiently decompose TCE, when mixed with the Ni-contained fine powder, at a level comparable to the case of mixing the white powder and the Ni-contained fine powder (No. 50) because an oxide attached to the powder surface is one formed during the water atomization, though the $H_2$ loss is in high level of not less than 0.15. Also, the non-oxidized black powder of No. 47 wherein the $H_2$ loss is less than 0.15 can decompose TCE at higher efficiency than the white powder (No. 50) in spite of that the non-oxidized black powder has an amount of oxide (i.e., an $H_2$ loss) attached to the powder surface, which is comparable to that of the white powder, because it has a martensite structure. Further, TCE can be efficiently decomposed (Nos. 51 to 53) with the combined use of the above-mentioned black powder with the white powder.

What is claimed is:

1. An iron-based cleaning powder comprising iron alloy powder produced with an atomization process, wherein said iron alloy powder contains at least Mn in the range of 0.3 to 1.1 mass %, passes a 300 μm-mesh sieve at a proportion of not less than 90%, and has an $H_2$-reduction mass loss of 0.1 to 0.8%, said iron alloy powder having a martensite structure or a tempered martensite structure.

2. An iron-based cleaning powder comprising iron alloy powder produced with an atomization process, wherein said iron alloy powder contains at least Ni in the range of 0.2 to 12 mass %, passes a 300 μm-mesh sieve at a proportion of not less than 90%, and has an $H_2$-reduction mass loss of 0.1 to 1.0%, said iron alloy powder having a martensite structure or a tempered martensite structure.

3. An iron-based cleaning powder in the form of mixed powder or partially alloyed powder, which is made up of iron powder and Ni-containing powder, wherein said iron powder passes a 300 μm-mesh sieve at a proportion of not less than 90% and has an $H_2$-reduction mass loss of 0.1 to 1.0%, said iron powder having a martensite structure or a tempered martensite structure, and said Ni-containing powder has a Ni content of not less than 40% and passes a 45 μm-mesh sieve at a proportion of not less than 90%.

4. The iron-based cleaning powder according to claim 3, wherein said Ni-containing powder has an $H_2$-reduction mass loss of 0 to 1.0%.

5. The iron-based cleaning powder according to claim 3, wherein a ratio of said iron powder to said Ni-containing powder (iron powder/Ni-containing powder) is in the range of 99.5/0.5 to 80/20 (mass ratio).

* * * * *

UNITED STATES PATENT AND TRADEMARK OFFICE
CERTIFICATE OF CORRECTION

PATENT NO. : 6,812,197 B2
DATED : November 2, 2004
INVENTOR(S) : Sakuma et al.

Page 1 of 1

It is certified that error appears in the above-identified patent and that said Letters Patent is hereby corrected as shown below:

<u>Title page,</u>
Item [73], Assignee, should read -- Kabushiki Kaisha Kobe Seiko Sho (Kobe Steel, Ltd.), Kobe (JP) --

Signed and Sealed this

Seventeenth Day of May, 2005

JON W. DUDAS
*Director of the United States Patent and Trademark Office*